United States Patent
De Ruffray et al.

(10) Patent No.: US 8,302,905 B2
(45) Date of Patent: Nov. 6, 2012

(54) AIRCRAFT LANDING GEAR COMPRISING AN OPERATION STRUT DEVICE AND AIRCRAFT PROVIDED THEREWITH

(75) Inventors: Paul De Ruffray, Toulouse (FR); Rodolphe Morel, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1069 days.

(21) Appl. No.: 12/094,385

(22) PCT Filed: Nov. 14, 2006

(86) PCT No.: PCT/EP2006/068463
§ 371 (c)(1),
(2), (4) Date: Sep. 22, 2008

(87) PCT Pub. No.: WO2007/057401
PCT Pub. Date: May 24, 2007

(65) Prior Publication Data
US 2009/0014582 A1    Jan. 15, 2009

(30) Foreign Application Priority Data
Nov. 21, 2005  (FR) ...................................... 05 53534

(51) Int. Cl.
*B64C 25/10*    (2006.01)
(52) U.S. Cl. ................................... 244/102 R
(58) Field of Classification Search .............. 244/102 R, 244/102 A, 100 R, 103 R
See application file for complete search history.

(56) References Cited

U.S. PATENT DOCUMENTS

| 2,661,171 | A |   | 12/1953 | Allen |          |
|-----------|---|---|---------|-------|----------|
| 2,692,097 | A | * | 10/1954 | Payne, Jr. ................... | 244/102 R |
| 2,811,326 | A | * | 10/1957 | Westcott, Jr. .............. | 244/102 R |
| 3,335,981 | A |   | 8/1967  | Julius et al. |          |
| 4,228,975 | A | * | 10/1980 | Sealey ........................ | 244/102 R |
| 5,429,323 | A | * | 7/1995  | Derrien et al. ............ | 244/102 R |
| 6,016,995 | A | * | 1/2000  | Squires et al. ............ | 244/102 R |
| 6,131,852 | A | * | 10/2000 | Holloway ................... | 244/102 R |
| 7,641,146 | B2| * | 1/2010  | Wood et al. .................... | 244/119 |
| 8,028,955 | B2| * | 10/2011 | De Ruffray et al. ...... | 244/102 R |

FOREIGN PATENT DOCUMENTS

| FR | 1234636 A | 10/1960 |
| GB | 529460 A  | 11/1940 |
| GB | 2344325 A | 6/2000  |

OTHER PUBLICATIONS

International Search Report dated Jan. 10, 2007.

* cited by examiner

*Primary Examiner* — Tien Dinh
(74) *Attorney, Agent, or Firm* — Perman Green, LLP

(57) ABSTRACT

An aircraft landing gear including a leg, a bracket which defines the axis of rotation of the leg on the operating plane defined by the leg extension and retraction positions and a leg operating device consisting of at least one strut whose first end is provided with a first means for connecting to the landing gear element and second end is provided with a second means for connecting to the element of the gear-receiving landing gear casing for which the at least one strut expands outside of the operating plane of the gear leg.

12 Claims, 5 Drawing Sheets

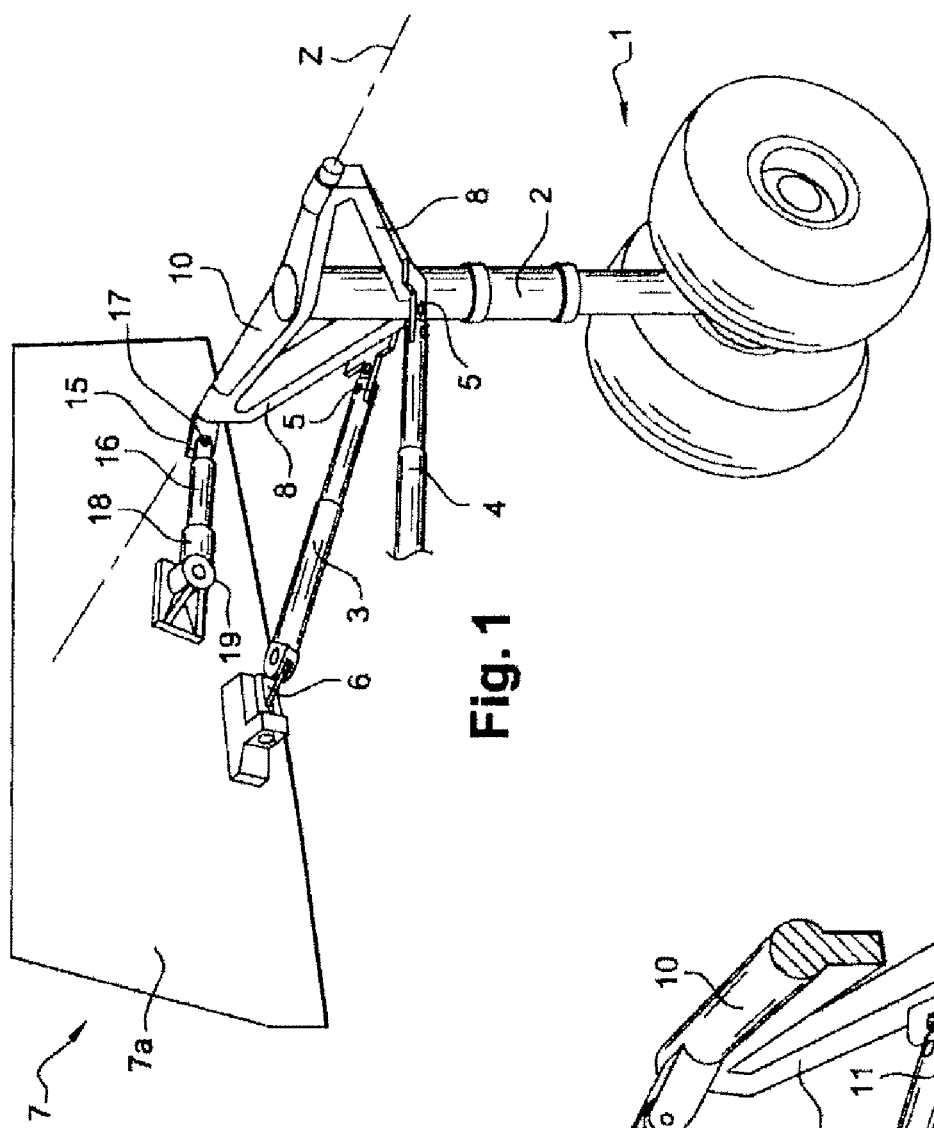
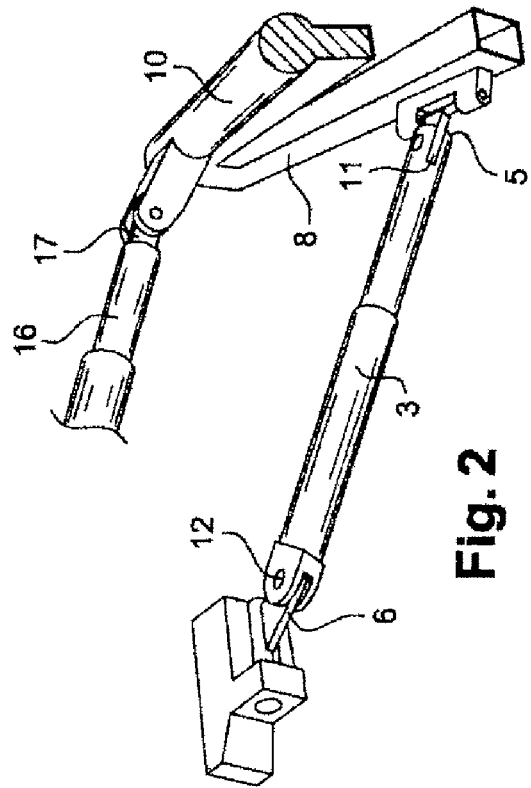
Fig. 1
Fig. 2

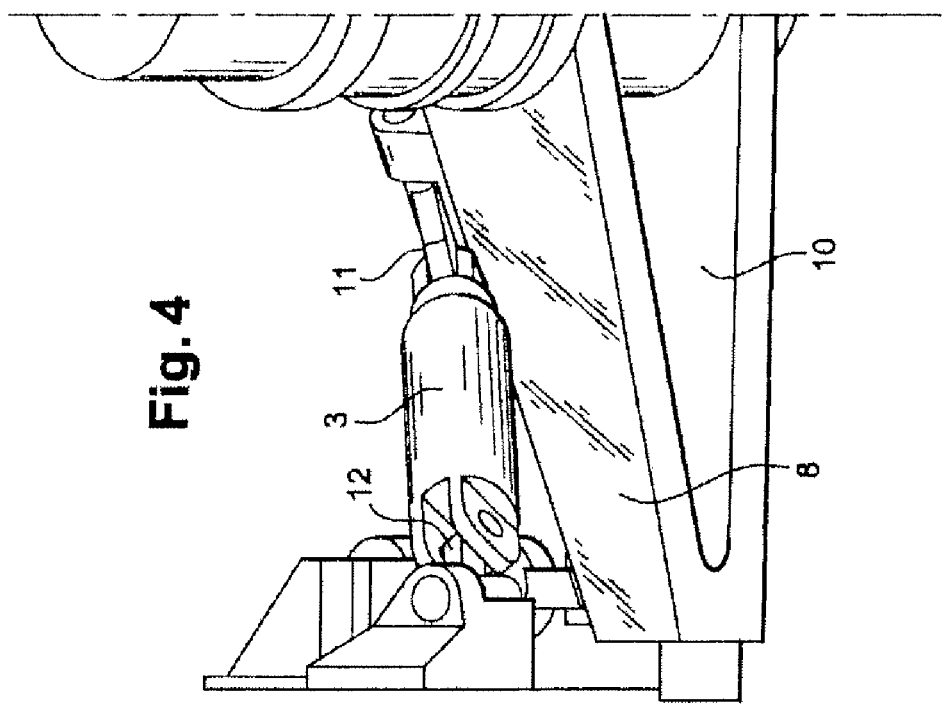
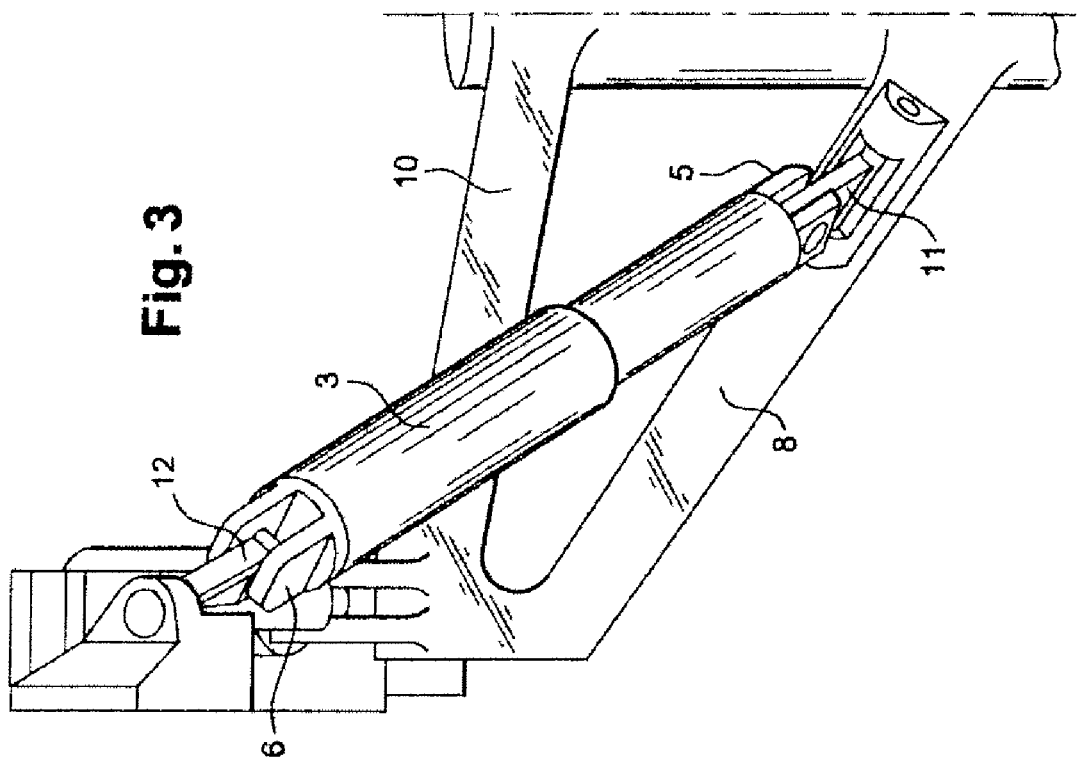

AIRCRAFT LANDING GEAR COMPRISING AN OPERATION STRUT DEVICE AND AIRCRAFT PROVIDED THEREWITH

CROSS REFERENCE TO RELATED APPLICATIONS

This application is the National Stage of International Application No. PCT/EP2006/068463, International Filing Date, 14 Nov. 2006, which designated the United States of America, and which International Application was published under PCT Article 21 (2) as WO Publication No. WO2007/057401 and which claims priority from French Application No. 0553534, filed on 21 Nov. 2005, the disclosures of which are incorporated herein by reference in their entireties.

BACKGROUND

1. Field

The disclosed embodiments concern a landing gear including an advanced strut operating device and aircraft provided therewith.

2. Brief Description of Related Developments

Different aircraft landing gear operating devices exist for the extension and retraction of the landing gear from its landing gear box and, in particular, there are operational devices including a telescopic strut with an articulated thruster on the landing gear leg and on a structure attached to the landing gear box.

The struts are devices which ensure that the landing gear legs lock in the lowered position.

In the case of landing gear equipped with a telescopic strut, the strut consists of a large stroke jack located above the landing gear in the retracted position, which makes it difficult to place them within the landing gear box and therefore requires that the boxes be of a significant size, in particular regarding the height for the housing for the struts.

Moreover, these struts, which are placed on the operational plane of the landing gear leg, must be attached under the top of the landing gear boxes which for this reason must be reinforced.

One alternative is to use a strut breaker, but this type of strut remains bulky once folded up when the landing gear is retracted into its box.

SUMMARY

The disclosed embodiments propose landing gear equipped with a simple and compact operating device and this intention envisages an aircraft landing gear which includes a leg, a bracket that defines an axis of rotation of the leg in the operational plane (P) defined by the extended and retracted leg position and a leg operating device including at least one strut comprising a first end equipped with a first means of connection with an element of the landing gear and a second end equipped with a second means of connection with an element of the gear-receiving landing gear box for which the aforementioned (at least) one strut extends out of the operating plane of the gear leg.

Advantageously, the landing gear according to the disclosed embodiments includes two struts placed on both sides of the operating plane and a second means of connection which are attached to the side panels of the landing gear box which makes it possible to create an especially compact landing gear.

Other characteristics and advantages of the disclosed embodiments shall become apparent by reading the following description of non-restrictive examples of the disclosed embodiments in reference to the figures which show:

BRIEF DESCRIPTION OF THE DRAWINGS

In FIG. 1: A view in perspective of a landing gear according to the disclosed embodiments, In FIG. 2: A detailed view of FIG. 1, In FIG. 3: A view in perspective of the front of a part of the landing gear of FIG. 1, gear extended, In FIG. 4: A view in perspective of the front of a part of the landing gear of FIG. 1, gear retracted, In FIG. 5: A side view of the landing gear of FIG. 1, gear extended, In FIG. 6: A side view of the landing gear of FIG. 1, gear retracted, In FIG. 7: The landing gear of FIG. 6, gear fully retracted inside the landing gear box, In FIG. 8: A view of the landing gear of the prior art, with the landing gear retracted, In FIG. 9A: A diagrammatic overview of the landing gear of FIG. 1, In FIG. 9B: Respective front and side views in perspective for an alternative embodiment for the landing gear according to the disclosed embodiments.

DETAILED DESCRIPTION OF THE DRAWINGS

Figure 6:
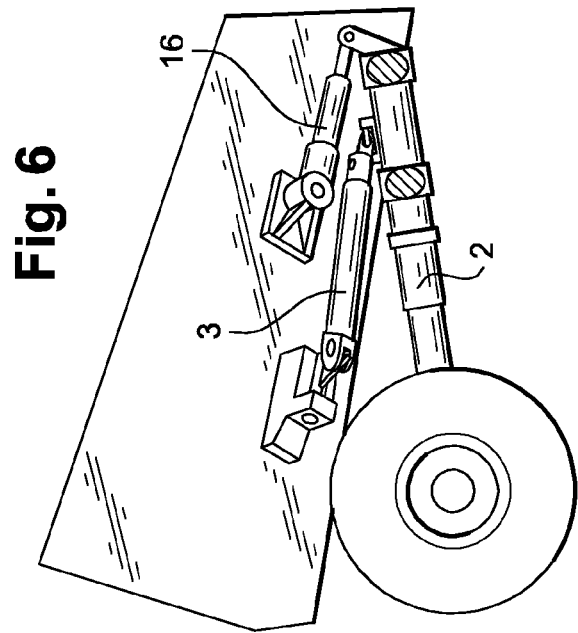

FIG. 1 describes in a general way a first example of an embodiment of the aircraft landing gear (1) according to the disclosed embodiments.

This landing gear includes one leg (2) and one bracket (10) placed on the highest point of the leg.

The bracket ensures the attachment of the landing gear in the landing gear box and constitutes a rotation axis of the leg in an operating plane (P) defined by an extended leg (2) position and a retracted leg (2) position and including the entire right set defined by the leg at the time of its movement.

In the case of a traditional landing gear, the ends of the bracket comprise levels received in the side chambers of the landing gear box.

According to the disclosed embodiments, the ends of the bracket defining the axis of rotation (Z) are, as will be seen hereafter, advantageously attached to the first end (17) of the leg operation jacks (16) and connected to the bracket through the connecting legs allowing a light offset of the rotation axis relative to an axis passing through the attachment point of the bracket on the leg.

For convenience, the bracket (10) shall be understood hereafter as including the connection legs, axis (Z) defined by the bracket passing through the axes which attach the jacks to the bracket.

The landing gear according to the disclosed embodiments includes a leg operating device consisting of at least one strut (3,4) which extends out of the operating plane of the gear leg.

In FIG. 2, which presents a detail of FIG. 1, the right strut supported by a segment of a reinforcement arm, the bracket end (10) and the attachment foot of the end (17) of a jack (16) are shown.

The strut is of the telescopic strut type.

It consists of a first end equipped with a first means of connection (5) to an element of the landing gear and a second end equipped with a second means of connection (6) to an element (7a) with a gear-receiving landing gear box.

In particular, the struts according to the disclosed embodiments, extending out of the operating plane of the landing gear leg are of a reduced length when compared to a traditional telescopic strut attached at the landing gear leg and to the ceiling of the landing gear box and which functions on the operating plane of the landing gear.

Advantageously, the element (7a) upon which the right strut is attached is a side panel of the landing gear box which may possibly be equipped with a stiffener or a bar which will retake the forces from the bearing transmitted by the strut.

In a symmetrical fashion, the left strut is attached to a side panel on the side opposite the landing gear box panel (7a).

More in particular, the landing gear according to the disclosed embodiments thus consists of two struts (3,4) laid out laterally on both sides of the landing gear leg and attached by their second means of connection to the corresponding side panels of the landing gear box.

Returning to FIG. 2, the first means of connection (5) are laid out on tilted reinforcement arms (8), connecting the leg at the ends of bracket (10) including the connection of the bracket (10) to the jacks (16).

The landing gear includes two struts (3,4) laid out on both sides of the operating plane and each one is connected to a side panel of the aircraft gear-receiving landing gear box. The second means of connection on the struts are connected again to the side panels (7a).

Figure 9A:
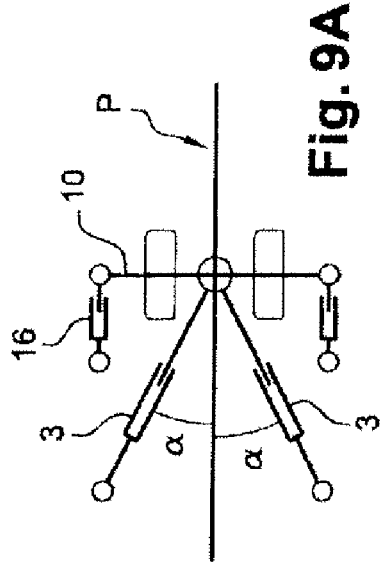

According to a first embodiment shown in FIG. 1 and diagramed in FIG. 9A, the struts (3,4) are laid out obliquely relative to the operating plane (P) of the landing gear leg (2).

In this case, at the time of the retraction and extension of the landing gear, the movement of landing gear's retraction/extension induces a rotation and torsion component of the struts which causes at least certain of the aforesaid means of connection (5,6) consisting of universal connection joints (11,12) to authorize the sliding motion of the telescopic shaft of the strut within its sleeve.

Moreover, a rotation of the strut piston within the body of the strut must be possible.

In particular, the second means of connection (6) consisting of a universal connection joint (11) between the strut and the aircraft landing gear box equipped with a landing gear according to the disclosed embodiments.

In the same manner, the first means of connection (5) of the strut on the leg or the reinforcement arm consists of a universal connection joint according to the example.

This solution has as a restraint that the forces within a transverse axis are introduced into the landing gear box which may require the inclusion of second points of strut attachment on the bars or stiffeners.

Figure 9B:
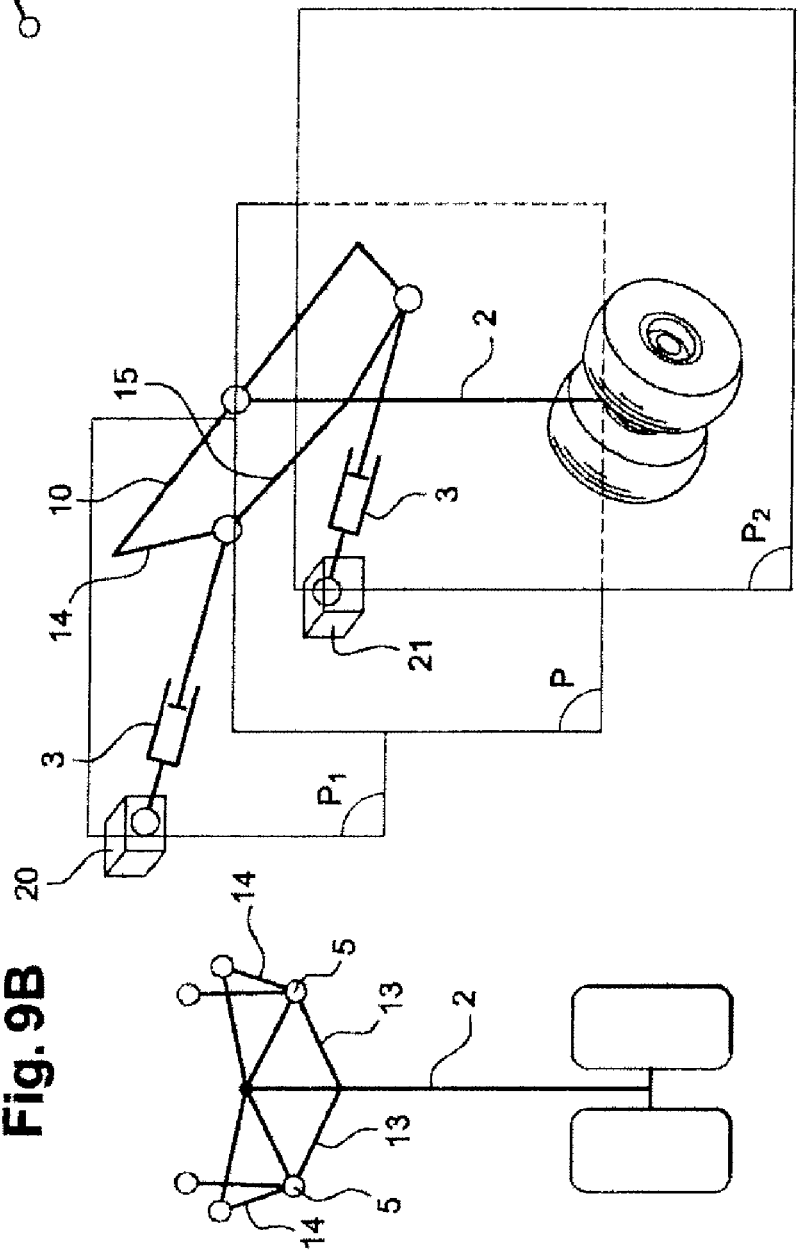

According to a second embodiment diagrammed in FIG. 9B, the struts extend into the planes (P1, P2) parallel with the leg (2) operating plane (P).

For this purpose, the tilted reinforcement arms connecting the leg at the ends of the attachment of the operating axis, are equipped with cross and offset branches (13 and 14) and the first means of connection to the struts on the arms are placed on the aforementioned offset branches (14).

Moreover, it may also be planned to pass jacks (20,21) through the side walls of the landing gear box and extending towards the inside of the aforesaid box to preserve the struts in parallel alignment with plane P.

This solution makes it possible to simplify the means of attachment of the struts on the landing gear and on the panels by avoiding universal connection joints by replacing them with simple rotary attachments; moreover this avoids the introduction of cross force into the landing gear box but has the disadvantage of causing moments when the reinforcement arms are bent.

As was noted above, and as seen in the example of FIGS. 1 to 7, the ends of the bracket (10) defining the operating axis (Z) are attached from the first ends (17) of the operating jacks (16).

Only one jack (16) is necessary and in this case at least one end of the bracket (10) defining the rotation axis (Z) is attached at a first end (17) of the operating leg jack (16).

The operating jacks (16) consist of one second end (18) connected to a side panel (7a) of the aforesaid box through a rotary attachment (19).

This advantageous provision makes it possible to position strut attachments more closely to the exit of the landing gear box to reduce to the maximum any obstruction of the landing gear on the aircraft.

Figure 5:
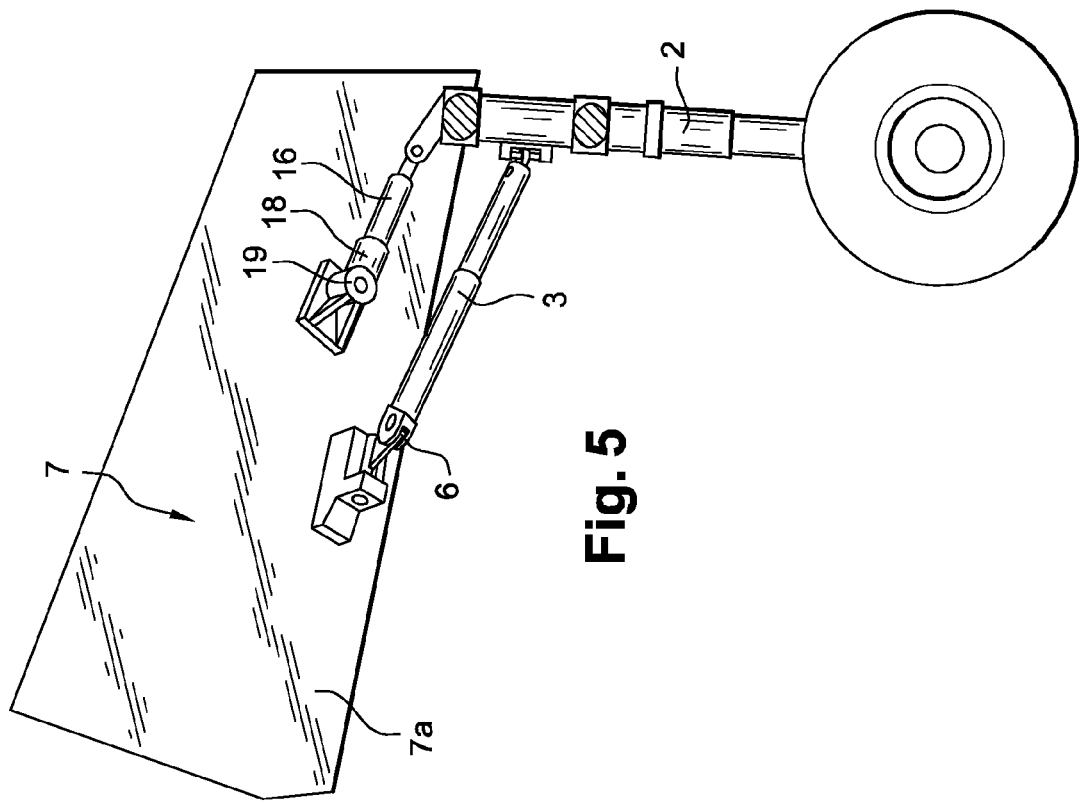
Figure 7:
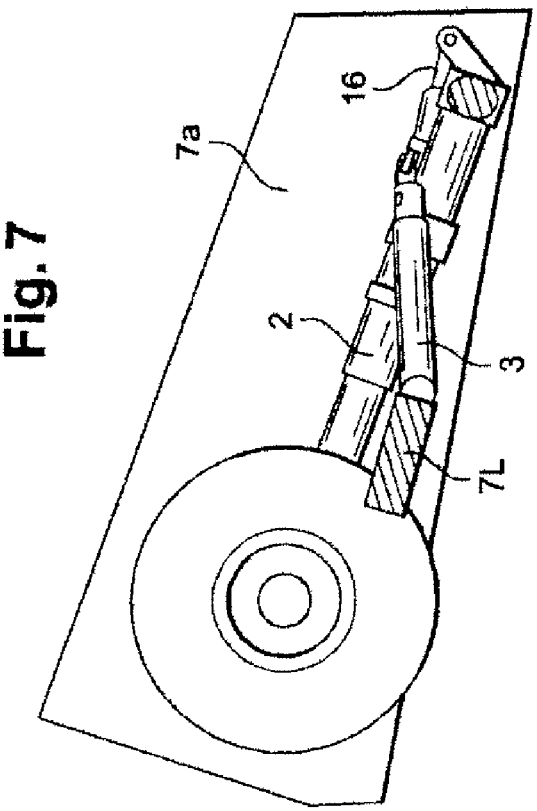

FIGS. 5, 6 and 7 which illustrate the retraction and extension of the landing gear, make it possible to understand the interest in this solution.

The extension of the landing gear is shown in FIG. 5, in a side view with a crosscut view of part of the bracket and part of the arm so that only the jack and the struts positioned behind the leg are visible.

In this position, the telescopic strut is at maximum extension and the jack is completely retracted. The landing gear is extended in the rolling and landing position.

FIG. 6 shows an intermediate position of the landing gear for which the strut is retracted and for which the jack is always compressed, with regard to FIG. 5 the leg has carried out a rotation around the axis (Z).

This position corresponds in fact to the retracted position of the landing gear including two struts according to the disclosed embodiments, but without a jack and for this reason, the rotation axis passes through the ends of the bracket (10), the ends of the latter being equipped with bearings which are received in the side panels.

As visible in FIG. 6, the leg did not completely retract and the wheel overshoots the landing gear box owing to the fact that the traction of the strut is not suitable for completely raising the landing gear leg as far as overshooting the horizontal plane passing through the axis (Z).

This type of construction is possible but requires a rather high placement of the leg rotation axis and the points of attachment in the landing gear box so that the wheels of the landing gear do not surpass the optimal solution sought by the disclosed embodiments for which the landing gear leg must be placed as low as possible in the landing gear box to free space in the aircraft at the top of this landing gear box.

Figure 8:
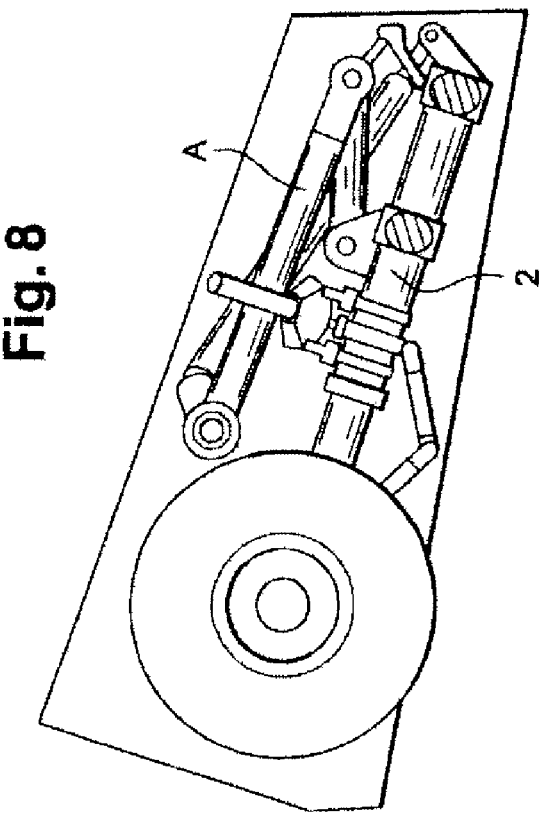

Thus, in an advantageous embodiment, the bracket (10) is mounted on the jacks (16), operating jacks which, as shown in FIG. 7, are extended once the struts are retracted in order to the cause the leg to swivel which rocks into a position in which the axis carrying the wheels is found above the axis (Z), the leg being then found above the points of attachments of the struts on the side panels of the landing gear box so that the position of the landing gear is similar to the position of a traditional landing gear, for example, a landing gear to strut breaker as shown in FIG. 8.

Thus, for an aircraft equipped with the landing gear according to the disclosed embodiments, one or more operating jacks (16) ensure the retraction and the extension of the landing gear, the struts (3,4) ensure locking of the undercarriage, the retraction of the landing gear being controlled specifically by the jacks.

The jacks and the struts constitute branches of flexible parallelograms which are positioned as close as possible to the entry of the landing gear box, the retraction of the landing gear in the landing gear box, controlled by the extension of the jacks (16) includes an extension sequence of said jacks; the extension sequence of the jacks includes ordering a retraction sequence of the struts, the extension sequence being prolonged to allow swinging of the leg beyond the horizontal plane during its retraction movement.

Conversely, at the time of the extension of the undercarriage, the jacks retract which orders the extension of the struts, the leg of the landing gear turning initially around an axis located between the fitting bolt of the struts on the leg and the attachment axis (Z) of the jacks on the bracket before turning around the axis (Z).

The position of the bracket opposite the struts is shown in a front view in FIGS. 3 and 4 which make it possible to view the rotation of the attachments to the universal connection joints used with oblique struts whose attachment points on the arms (8) are created closer to the leg of the landing gear in order to minimize warping force on the arms (8).

These FIGS. 3 and 4, and FIG. 7 in particular, make it possible to show that the undercarriage provided with two side struts included on the side panels of the landing gear box is a particularly compact landing gear, which is due to the reduced length of the struts according to the disclosed embodiments.

The landing gear box may thus be reduced in height; indeed, it may be constituted by a structural and envelope framework built closest to the undercarriage to free up space in the aircraft, this space making it possible to hold additional equipment and to reduce the mass of the landing gear box.

The invention claimed is:

1. An aircraft landing gear comprising:
a leg,
a bracket defining a rotation axis of the leg on an operating plane of the leg defined by extension and retraction positions of the leg, and
a leg operating device including a pair of struts each comprising a first end equipped with a first means of connection with an element of the landing gear and a second end equipped with a second means of connection with an element of a gear-receiving landing gear box,
wherein the first means of connection are positioned on tilted reinforcement arms, the tilted reinforcement arms connecting the leg to ends of a bracket defining a rotation axis of the leg,
wherein said pair of struts is positioned obliquely relative to the operating plane of the leg,
wherein the first means of connection comprises universal connection joints, and
wherein the ends of the bracket defining the rotation axis of the leg are each attached to a first end of a leg operating jack.

2. An aircraft landing gear according to claim 1, wherein the struts are laid out on both sides of the operating plane and wherein the second means of connection are attached to side panels of the landing gear box.

3. An aircraft comprising a landing gear according to claim 1 received in the gear-receiving landing gear box, wherein each second means of connection is attached to a side panel of the landing gear box.

4. An aircraft according to claim 3, wherein the second means of connection comprises a universal connection joint.

5. An aircraft according to claim 3, wherein the ends of the bracket defining the axis of operation are attached to first ends of operating jacks, the operating jacks each comprising a second end connected to a side panel of the landing gear box through a rotary attachment.

6. An aircraft comprising a landing gear according to claim 5 wherein said jacks and said struts are designed to provide a swinging of the leg beyond a horizontal plane during a retraction movement.

7. An aircraft landing gear comprising:
a leg;
a bracket defining a rotation axis of the leg on the operating plane defined by the leg extension and retraction positions; and
a leg operating device including a pair of struts, each comprising a first end equipped with a first means of connection with an element of the landing gear and a second end equipped with a second means of connection with an element of a gear-receiving landing gear box,
wherein the first means of connection are positioned on tilted reinforcement arms, the tilted reinforcement arms connecting the leg to ends of a bracket defining a rotation axis of the leg,
wherein the tilted reinforcement arms connecting the leg to said ends of said bracket include cross branches and offset branches,
wherein the first means of connection are positioned on the offset branches of said tilted reinforcement arms, and
wherein the ends of the bracket defining the rotation axis of the leg are each attached to a first end of a leg operating jack.

8. An aircraft landing gear according to claim 7, wherein the first means of connection comprises universal connection joints.

9. An aircraft landing gear according to claim 7, wherein said second means of connection are attached to side panels of the landing gear box.

10. An aircraft landing gear according to claim 9, wherein the second means of connection comprises a universal connection joint.

11. An aircraft comprising an aircraft landing gear according to claim 7 wherein said operating jacks and said struts constitute branches of flexible parallelograms having first and second angles made of attachment points to the side panels of said landing gear box, a third angle made of an attachment point to said bracket, and a fourth angle made of an attachment point to said tilted reinforcement arm.

12. An aircraft according to claims 11 wherein a process of retraction of the landing gear in the landing gear box includes an extension sequence of said jacks, in parallel with a contraction sequence of the struts, said extension sequence being prolonged to provide a swinging of the leg beyond a horizontal plane during the retraction.

* * * * *

UNITED STATES PATENT AND TRADEMARK OFFICE
CERTIFICATE OF CORRECTION

| | |
|---|---|
| PATENT NO. | : 8,302,905 B2 |
| APPLICATION NO. | : 12/094385 |
| DATED | : November 6, 2012 |
| INVENTOR(S) | : De Ruffray et al. |

Page 1 of 1

It is certified that error appears in the above-identified patent and that said Letters Patent is hereby corrected as shown below:

Column 6, line 50, Claim 12, delete "claims" and insert -- claim --, therefor.

Signed and Sealed this
Twelfth Day of March, 2013

Teresa Stanek Rea
*Acting Director of the United States Patent and Trademark Office*